(12) United States Patent
Abe

(10) Patent No.: US 7,667,915 B2
(45) Date of Patent: Feb. 23, 2010

(54) DISK DRIVE HAVING A HEAD AMPLIFIER FOR PERPENDICULAR MAGNETIC RECORDING

(75) Inventor: Masakazu Abe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 456 days.

(21) Appl. No.: 11/601,685

(22) Filed: Nov. 20, 2006

(65) Prior Publication Data
US 2007/0121234 A1 May 31, 2007

(30) Foreign Application Priority Data
Nov. 29, 2005 (JP) ............... 2005-343967

(51) Int. Cl.
*G11B 5/03* (2006.01)
(52) U.S. Cl. ............... 360/66; 360/51; 360/61
(58) Field of Classification Search ........ None
See application file for complete search history.

(56) References Cited

U.S. PATENT DOCUMENTS

| 4,202,017 | A | * | 5/1980 | Geffon et al. ............ 360/45 |
| 4,287,540 | A | * | 9/1981 | Cheatham et al. ........ 360/18 |
| 7,079,345 | B1 | * | 7/2006 | Nguy et al. ............ 360/66 |
| 7,092,186 | B1 | * | 8/2006 | Hogg ............ 360/60 |
| 7,532,426 | B2 | * | 5/2009 | Nakagawa et al. ........ 360/66 |
| 2003/0223147 | A1 | | 12/2003 | Nishida et al. |
| 2006/0139788 | A1 | * | 6/2006 | Yang et al. ............ 360/75 |

FOREIGN PATENT DOCUMENTS

| JP | 61-280007 | 12/1986 |
| JP | 02-027504 | 1/1990 |
| JP | 2001-067605 | 3/2001 |
| JP | 2004-295985 | 10/2004 |

OTHER PUBLICATIONS

Japanese Office Action dated Jun. 16, 2009 for Appln. No. 2005-343967.

* cited by examiner

*Primary Examiner*—Jason C Olson
(74) *Attorney, Agent, or Firm*—Pillsbury Winthrop Shaw Pittman, LLP

(57) ABSTRACT

According to one embodiment, a disk drive is provided which has a head amplifier having a function of, at a data recording time, outputting AC pattern data to a write head prior to the recording of the write data to allow it to be recorded on a write splice section on a disk medium. The write head records an AC signal pattern of a high frequency on the write splice section on the disk medium according to an output timing of a write gate and then write data is recorded with a preamble as a header.

10 Claims, 4 Drawing Sheets

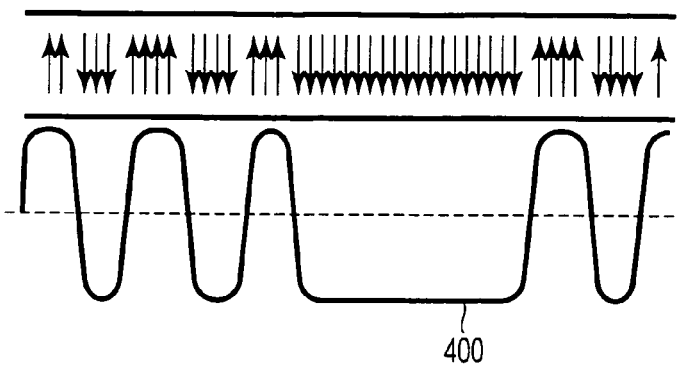
F I G. 4 A
F I G. 4 B
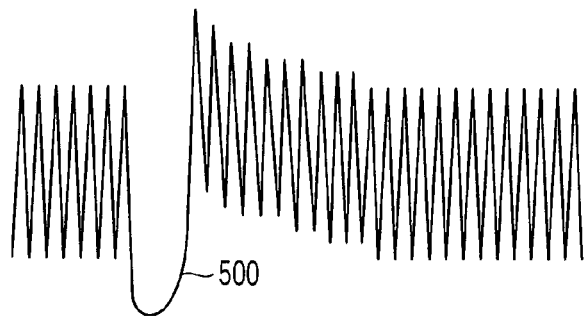
F I G. 5
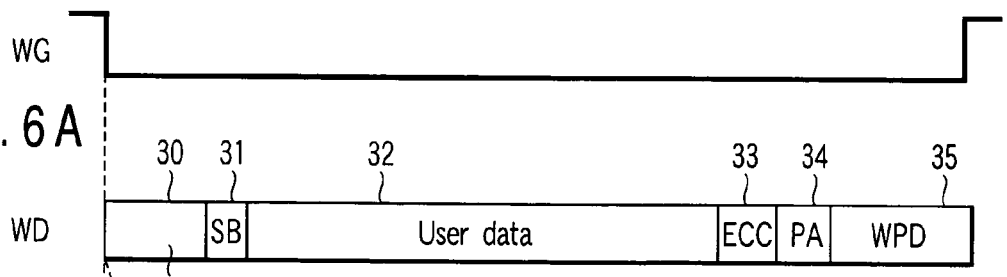
F I G. 6 A
F I G. 6 B
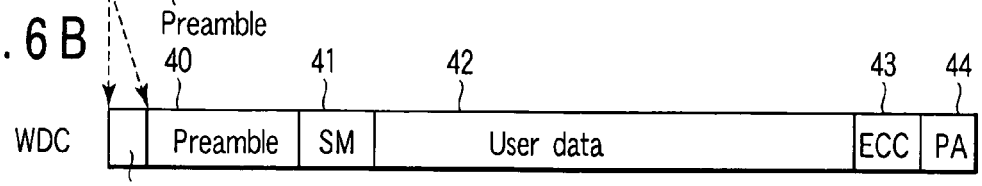
F I G. 6 C
F I G. 6 D

DISK DRIVE HAVING A HEAD AMPLIFIER FOR PERPENDICULAR MAGNETIC RECORDING

CROSS-REFERENCE TO RELATED APPLICATIONS

This application is based upon and claims the benefit of priority from Japanese Patent Application No. 2005-343967, filed Nov. 29, 2005, the entire contents of which are incorporated herein by reference.

BACKGROUND

1. Field

One embodiment of the invention relates generally to a disk drive and, in particular, to a disk drive for perpendicular magnetic recording.

2. Description of the Related Art

In general, a disk drive representative of a hard disk drive is adapted to, when data is recorded on a disk medium, generate a timing signal called a write gate and output data (write data) from a read/write channel to a head amplifier in response to an output timing of the write gate. The head amplifier converts the write data to a write signal (write current) and outputs it to a head (see, for example, JPN. PAT. APPLN. KOKAI PUBLICATION NO. 2004-295985).

Here, due to a delay of, for example, a circuit constituting a read/write channel, a write signal is output from a head, actually, in a way to be delayed from an output timing point of a write gate and is recorded as data onto the disk medium. At this time, that delayed portion is recorded as a write splice (WS) on the disk medium. This write splice section serves as an area recorded immediately prior to a preamble serving as a header of the write data. The record pattern of the write splice section provides a direct current (DC) pattern of no magnetic inversion.

In recent years, a disk drive of a perpendicular magnetic recording system has been practically adopted. In such a disk drive, if the above-mentioned write splice section is present, the reproduced waveform from a read head becomes a DC-offset waveform due to the filter characteristic of the head amplifier. Upon being input to the read/write channel, the reproduced waveform exerts an adverse effect on the signal processing for reproducing the recorded data.

In the read/write channel, the acquisition operation of a PLL circuit is effected by the preamble of the reproducing signal. In this case, under an influence of the DC offset reproduction waveform, the acquisition operation of the PLL circuit becomes unstable by the preamble, thus presenting a situation of causing a delay of the acquisition operation.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 4A and 4B show a reproduction waveform for a perpendicular magnetic recording system relating to the present embodiment;

FIG. 5 is a view showing a reproduction waveform for explaining an effect relating to the present embodiment;

FIGS. 6A to 6D are views showing a timing chart of a write operation for explaining the effect relating to the present embodiment.

DETAILED DESCRIPTION

Various embodiments according to the invention will be described hereinafter with reference to the accompanying drawings. In general, according to one embodiment of the invention, there is to provided a disk drive including a head amplifier having the function of, at a data recording time, automatically recording an AC pattern signal on a write splice section on a disk medium.

The embodiment of the invention will be described below with reference to the drawings.

(Structure of Disk Drive)

Figure 1:
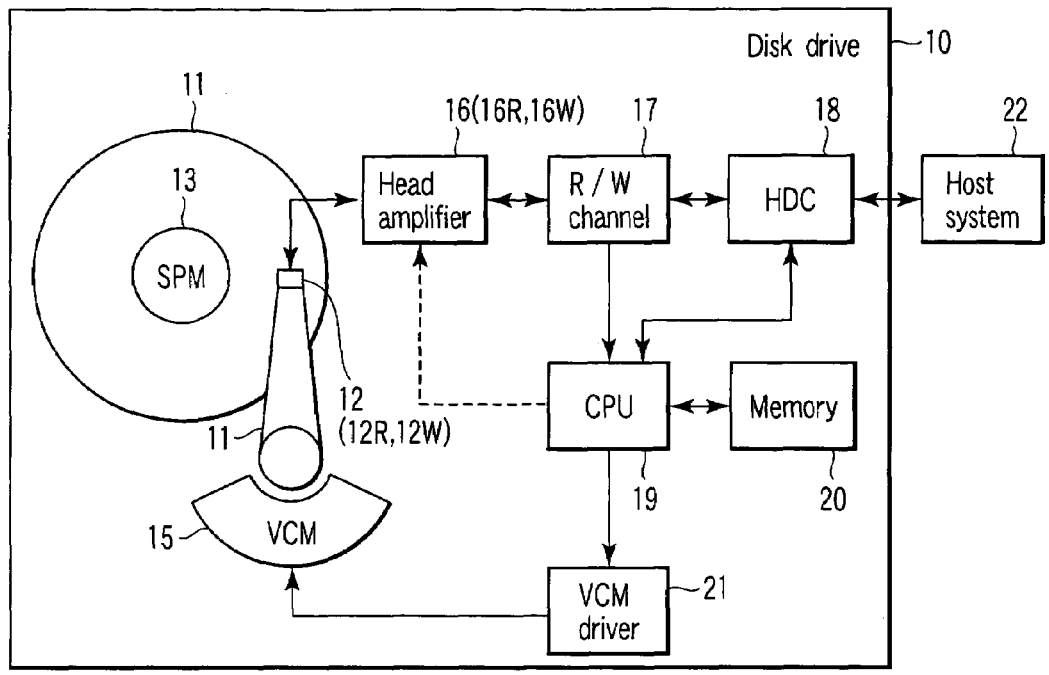
FIG. 1 is a block diagram showing an arrangement of a disk drive relating to an embodiment of the present invention.

FIG. 1 is a block diagram showing an arrangement of a disk drive of a perpendicular magnetic recording system.

A disk drive 10 of the present embodiment has a disk medium 11 for allowing the perpendicular magnetic recording and a magnetic head 12. The disk medium 11 is fixed in place on a spindle motor (SPM) 13 and incorporated within the disk drive 10 to allow it to be turned at a high speed.

The magnetic head 12 is of such a structure as to have a read head 12R and write head 12W mounted on the same slider, the read head being used to read out recorded data from the disk medium 11 and the write head 12W being used to record data (write data) onto the disk medium 11. The write head 12W is of such a single magnetic pole type as to allow perpendicular magnetic recording, on a disk medium 11, of the write data corresponding to a write signal (write current) which is output from the head amplifier circuit 16 as will be set out below.

The magnetic head 12 is mounted on an actuator 14 driven by a voice coil motor (VCM) 15. The VCM 15 is driven upon receipt of a drive current from a VCM driver 21. The actuator 14 is comprised of a head moving mechanism which is driven under control of a microprocessor (CPU) 19 to allow the magnetic head 12 to be located on a target portion (target track) on the disk medium.

In addition to such head assembly, the disk drive 10 also includes the head amplifier 16, read/write channel 17, disk controller (HDC) 18, CPU 19 and memory 20.

The head amplifier circuit 16 includes a read amplifier circuit 16R for amplifying a read signal which is output from the read head 12R and a write amplifier circuit 16W which supplies a write signal to a write head 12W. The read/write channel 17 performs signal processing for reproducing the recorded data from the read signal and signal processing for processing the write data (for example, NRZ data) from the HDC 18.

HDC 18 has an interface function between the disk drive 10 and a host system 22 (for example, a personal computer and various kinds of digital devices). The HDC 18 performs read/write data transfer control between the disk 11 and the host system 22. The CPU 19 is comprised of a main controller of the disk drive 10 and performs head positioning control as well as control of normal read/write operation of user data.

Further, as will be set out below, the CPU 19 gains access to a register 164 in the write amplifier circuit 16W included in the head amplifier circuit 16 and sets data for setting the frequency of AC pattern (AC signal) data relating to the present embodiment.

The memory 20 includes, in addition to a flash memory (EEPROM) of a nonvolatile memory, a RAM, ROM and so on and retains various kinds of data and program necessary to control the CPU 19.

(Structure of Write Amplifier Circuit)

Figure 2:
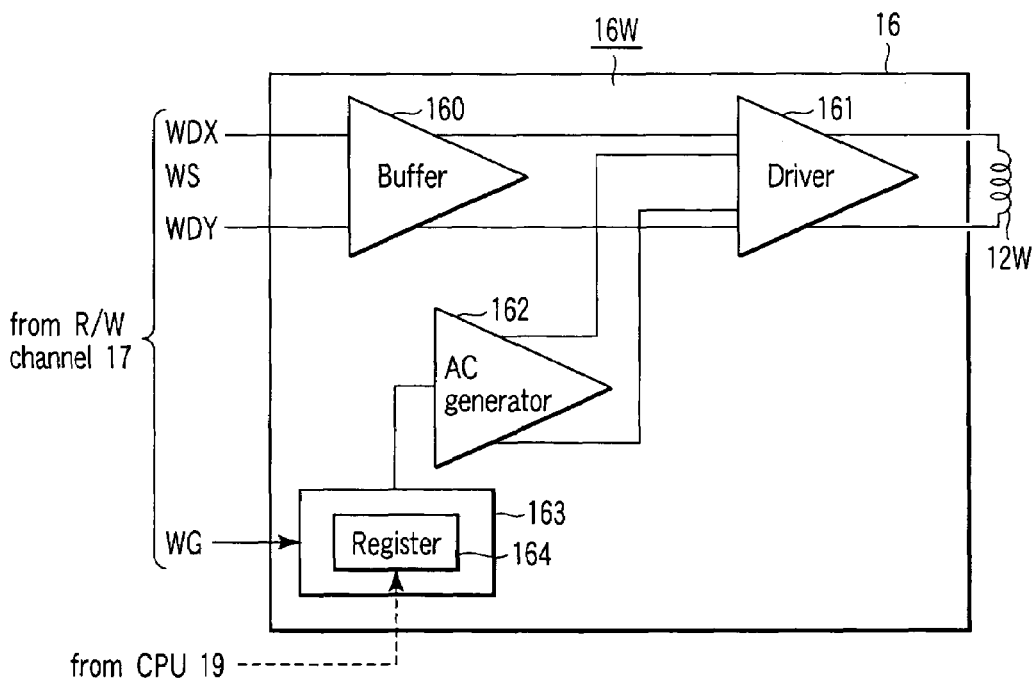
FIG. 2 is a block diagram showing a major section of a write amplifier circuit relating to the present embodiment.
Figure 3:
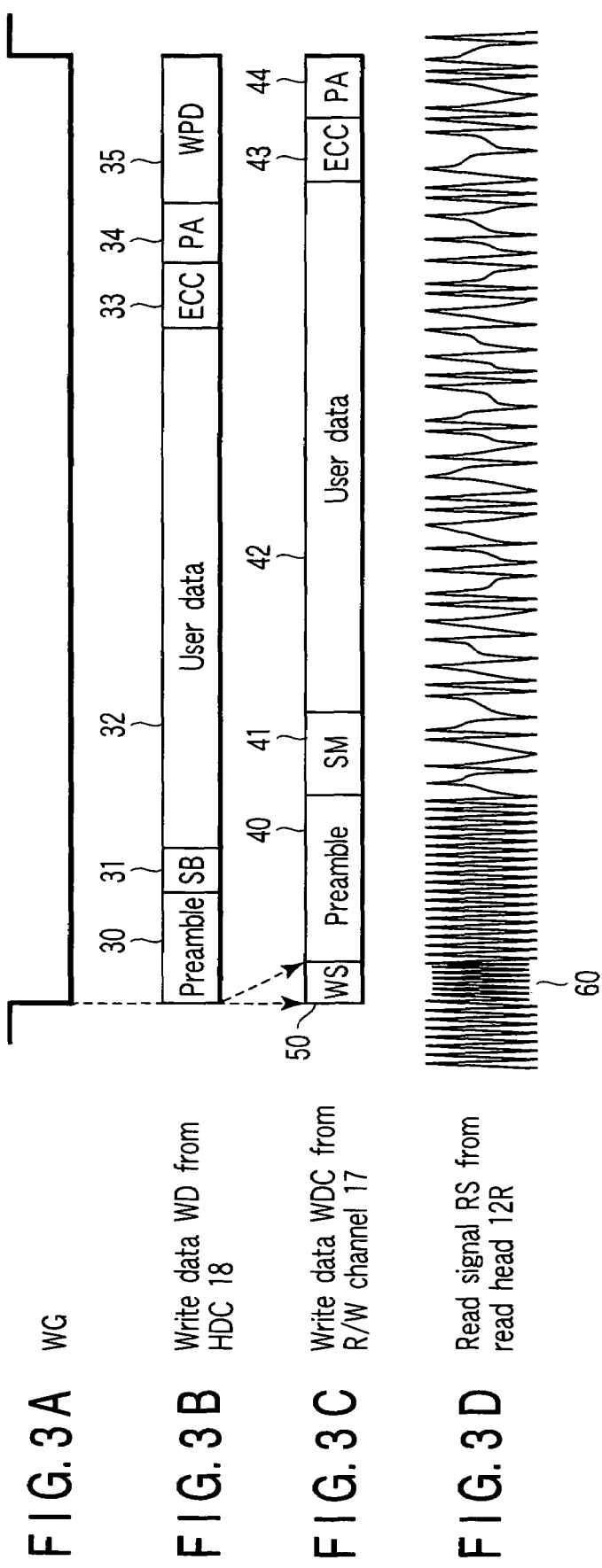
FIGS. 3A to 3D show a configuration of write data relating to the present embodiment and a timing chart of a write operation.
Figure 7:
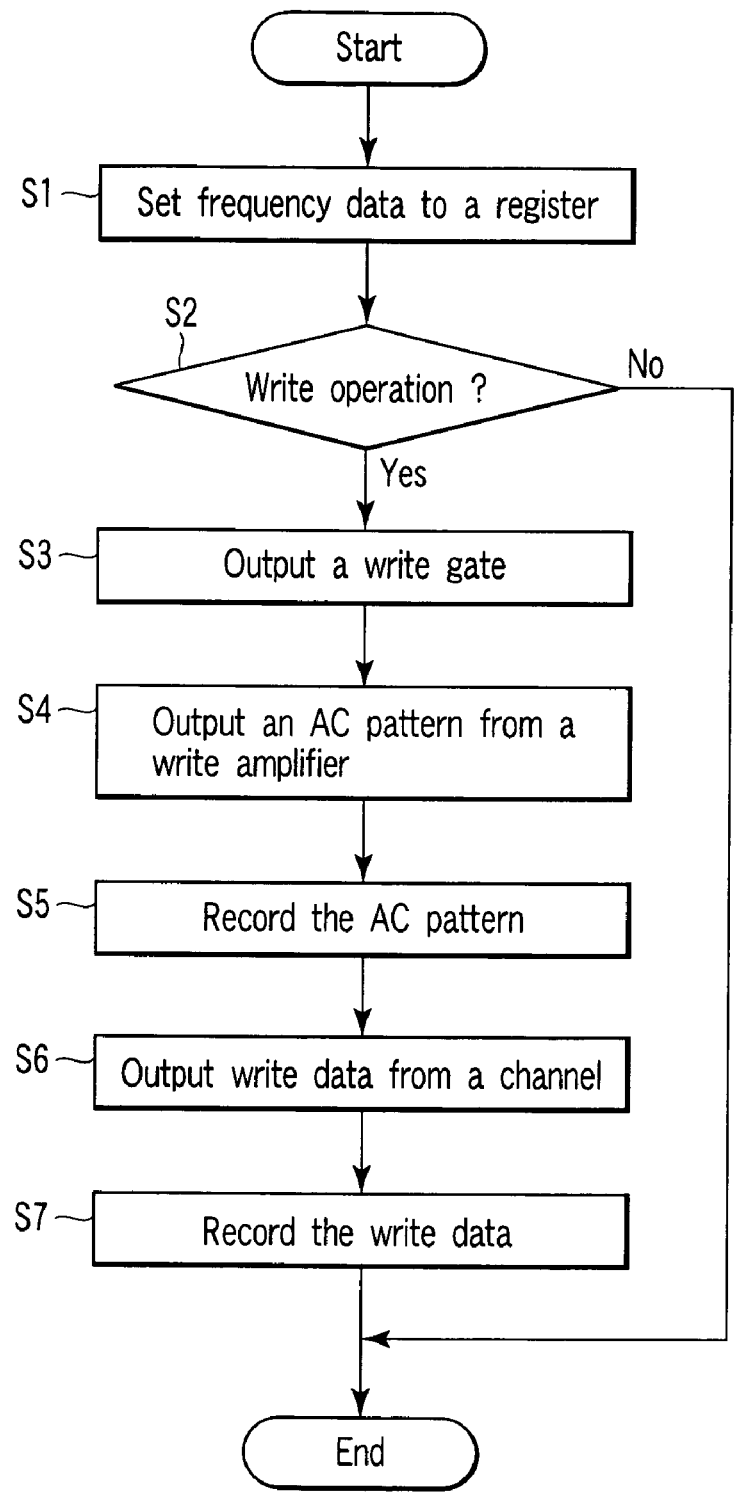
FIG. 7 is a flowchart for explaining the process of a write operation relating to the present embodiment.

The head amplifier circuit 16 of the present embodiment includes a write amplifier circuit 16 as shown in FIG. 2. The write amplifier circuit 16W has a buffer circuit 160, driver 161 and AC generator 16W. The buffer circuit 160 buffers write data WDC (data to be recorded on the disk medium 11) which is output from the read/write channel 17.

The driver 161 allows write data which is output from the buffer 160, or AC pattern data which is output from the AC generator 162, to be converted to a write signal (write current) and supplies it to the write head 12W.

The AC generator 162 is controlled by a controller 163 and outputs, to the driver 161, AC pattern data (AC signal data of a high frequency) of a frequency corresponding to the frequency setting data which is set by the register 164. According to the write gate WG which is output from the read/write channel 17, the controller 163 controls the outputting of the AC pattern data from the AC generator 162 only during a predetermined time prior to the outputting of the write data from the buffer circuit 160. The controller 163 includes the register 164 accessible from the CPU 19. The frequency setting data is set by the CPU 19 to the register 164.

(Write Operation)

Referring to not only FIGS. 1 and 2 but also FIGS. 3A to 7, an explanation will be made below about the write operation under the perpendicular magnetic recording system of the disk drive 10 relating to the present embodiment.

When the HDC 18 receives a write command from the host system 22, the disk drive 10 starts a write operation for recording write data on the disk medium 11. The HDC 18 delivers a write gate WG designating a write operation timing as well as write data WD to the read/write channel 17.

As shown in FIG. 3B, the write data WD has, as seen from a header side, a preamble 30, sync byte (SB) 31, use data 32, error correction (ECC) data, postamble (PA) 34 and write pass delay section (WPD) 35.

Here, as shown in FIG. 2, prior to the starting of the write operation, the CPU 19 gains access to the register 164 of the controller 163 in the write amplifier circuit 16W and sets the frequency setting data (step S1).

At the write operation time, as set out above, the write gate WG is output from the HDC 18 (step S2, S3). In response to the output of the write gate WG from the HDC 18, the read/write channel 17 outputs write data WDC, a signal-processed one of the write data WD, to a write amplifier circuit 16W in the head amplifier circuit 16 (step S6).

Here, as shown in FIG. 3C, due to a circuit delay involved, from the read/write channel 17, an output of the write data WDC is delayed from the output timing of the write gate WG only by a time corresponding to a write splice section WS. At this time, according to the present embodiment, as shown in FIG. 2, the controller 163 in the write amplifier circuit 16W allows AC pattern data from the AC generator 162 to be output, only during a predetermined time, from the AC generator 162 in response to the output timing of the write gate WG which is output from the read/write channel 17. It is to be noted that this predetermined time is a time corresponding to the write splice section WS.

Under control of the controller 163, the AC generator 162 outputs, to the driver 161, the AC pattern data (50) of a frequency (high frequency) corresponding to the frequency setting data set to the register 164 (step S4). The driver 161 converts the AC pattern data (50) to the write signal (write current) and supplies it to the write head 12W. By doing so, the write head 12W records the AC signal pattern corresponding to the AC pattern data (50) on the disk medium (step S5).

After the outputting of the write signal corresponding to the AC pattern data (50), the buffer circuit 160 in the write amplifier circuit 16W buffers the write data WDC output from the read/write channel 17 and outputs it to the driver 161 (step S6). The driver 161 converts a write signal (write current) and supplies it to the write head 12W. By doing so, the write head 12W records data corresponding to the write data WDC on the disk medium in a way to be continuous with the write splice section WS-step S7.

By the write operation, as shown in FIG. 3C, the AC pattern data (50) is recorded at the write splice section WS on the disk medium 11. Continuous with the AC pattern data (50), the preamble 40, sync mark (SM) 41, user data 42, error correction (ECC) data and postamble (PA) 44 corresponding to the WDC are recorded on the disk medium 11.

When the data recorded on the disk medium 11 is read out by the read head 12R, a read signal RS of a reproduction waveform as shown in FIG. 3D is reproduced. That is, an AC signal pattern 60 of a high frequency corresponding to the AC pattern data (50) is reproduced from the write splice section WS.

A stable reproduction waveform not influenced by a DC offset waveform (500 in FIG. 5) is input to be read/write channel 17 immediately prior to the preamble 40. By doing so, the read/write channel 17 can stably perform signal processing for reproducing the perpendicular magnetic recorded data, that is, perform signal processing without being adversely influenced by the DC offset waveform.

(Effect)

The detailed effect of the write operation under perpendicular magnetic recording system according to the present embodiment will be explained below by referring to FIGS. 3A to 3D and FIG. 4A to FIG. 6D.

In the disk drive of the perpendicular magnetic recording system, as shown in FIG. 4A, the write data is perpendicular magnetic recorded by the write head 12W on the disk medium 11. In this case, the perpendicular magnetic recorded data on the disk medium 11, upon being reproduced by the read head 12R, becomes a reproduction waveform as shown in FIG. 4B. That is, at a portion free from any transition (?) point of the magnetic pole, the reproduction waveform is output as a DC component with the amplitude defined by an upper limit or a lower limit.

If the data of the DC component is perpendicular magnetic recorded on the write splice section prior to the recording of the write data, its reproduction waveform becomes a waveform 500 with only the DC component offset as shown in FIG. 5.

Put it in more detail, if, as shown in FIG. 6C, a DC pattern other than the AC pattern data (50) of the present embodiment is recorded on the write splice section WS, then the DC offset waveform 500 is included into a reproduction waveform output from the read head 12R.

According to the write operation under the perpendicular magnetic recoding system of the present embodiment, AC pattern data (50) is recorded on the write splice section WS as shown in FIG. 6D. Therefore, where recorded data is reproduced by the read head 12R, it is possible to initially avoid the DC offset waveform from being included in the reproduction waveform.

By doing so, in a read/write channel 17, at a time of the signal processing for reproducing recorded data from a reproduction waveform from the read head 12R, it is possible to prevent the situation such as a delay of the acquisition operation of the PLL circuit affected by the DC offset waveform.

To sum up, at the write operation under the perpendicular magnetic system of the present invention, when the write data is output in response to the output timing of the write gate WG, the AC pattern (50) of a high frequency is recorded on the write splice section WS corresponding to its delay. At the data reproduction time, it is possible to, from the read head 12R, output a reproduction waveform not affected by the DC offset waveform. Since the read/write channel 17 receives, as an input, a stable reproduction waveform not affected by the DC offset waveform, it is possible to stably perform signal processing for reproducing the recorded data.

Another Embodiment

In the present embodiment, a CPU 19 gains access to a register 164 in a write amplifier circuit 16W of a head amplifier circuit 16 and sets data for setting the frequency of AC pattern data (AC signal) relating to the present embodiment.

A CPU 19 may be of such a type that it sets, not only the frequency of the AC pattern data, but also data for setting an output time of the AC pattern data to the register 164.

By doing so, in response to an output timing of the write gate WG which is output from the read/write channel 17, the controller 163 in the write amplifier circuit 16W allows the AC pattern data to be output from the AC generator 162 and to do so only during a time set to the register 164. In other words, the write amplifier circuit 16W allows the AC pattern data to be output from the AC generator 162 not only during a predetermined time corresponding to the write splice section WS but also during any arbitrary set time.

According to the present embodiments, it is possible to, at a data recording time, avoid a DC component from being recorded at a write splice section and to stably realize a reproduction operation of the recorded data. In particular, the present embodiments are effective to the disk drive of the perpendicular magnetic recording system.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the invention.

What is claimed is:

1. A disk drive comprising:
a write head configured to record data on a disk medium;
a data output unit configured to output data to be recorded on the disk medium;
a head amplifier configured to include a first unit for allowing a write signal which corresponds to the data from the data output unit to be output to the write head when data is recorded on the disk medium and a second unit for allowing an AC signal to be output to the write head prior to the outputting of the write signal;
a controller configured to control the recording of the data; and
a unit configured to output a write gate signal for instructing a data recording timing to the disk medium,
wherein the second unit includes a register accessed by the controller and configured to retain data for setting the frequency of the AC signal, and a unit configured to, according to the write gate signal, allow an AC signal of a frequency which is set by the retained data in the register to be generated only during a predetermined time immediately prior to the outputting of the write signal.

2. The disk drive of claim 1, wherein the controller controls the write head to record a pattern data corresponding to the AC signal prior to a preamble on the disk medium.

3. The disk drive of claim 1, wherein the head amplifier includes a driver configured to supply a write current corresponding to the write signal to the write head.

4. The disk drive of claim 3, wherein the head amplifier includes an AC signal generator configured to generate the AC signal and output the AC signal to the driver.

5. The disk drive of claim 1, wherein the disk medium and write head are of such a configuration as to be suited to perpendicular magnetic recording.

6. The disk drive of claim 1, wherein the second unit includes a unit configured to set an output time of the AC signal and a unit configured to generate the AC signal for the output time.

7. A head amplifier device applied to a disk storage device including a write head configured to allow data to be stored in a disk medium and a data output unit for outputting the data to be stored in the disk medium, comprising:
a first unit configured to output a write signal to the write head, the write signal corresponding to the data which is output from the data output unit; and
a second unit configured to output an AC signal of a frequency set prior to the outputting of the write signal to the write head,
wherein the second unit includes a register configured to retain data for setting a frequency of the AC signal and a generator configured to, according to a write gate signal generated in the disk storage device, generate an AC signal of a frequency only during a predetermined time immediately prior to the outputting of the write signal, the frequency being set by the data retained in the register.

8. The head amplifier device of claim 7, wherein the first unit includes a driver configured to supply a write current corresponding to the write signal to the write head.

9. The head amplifier device of claim 8, wherein the second unit includes an AC signal generator configured to generate the AC signal and output the AC signal to the driver.

10. The head amplifier device of claim 7, wherein the second unit includes a unit configured to set an output time of the AC signal and a generator configured to generate the AC signal for the output time.

* * * * *